Sept. 19, 1950     J. F. T. ZONDAGH     2,522,917
FRUIT-GRADING APPARATUS

Filed Dec. 2, 1947     3 Sheets-Sheet 1

INVENTOR
J. F. T. ZONDAGH
By E. F. Wenderoth
Attorney

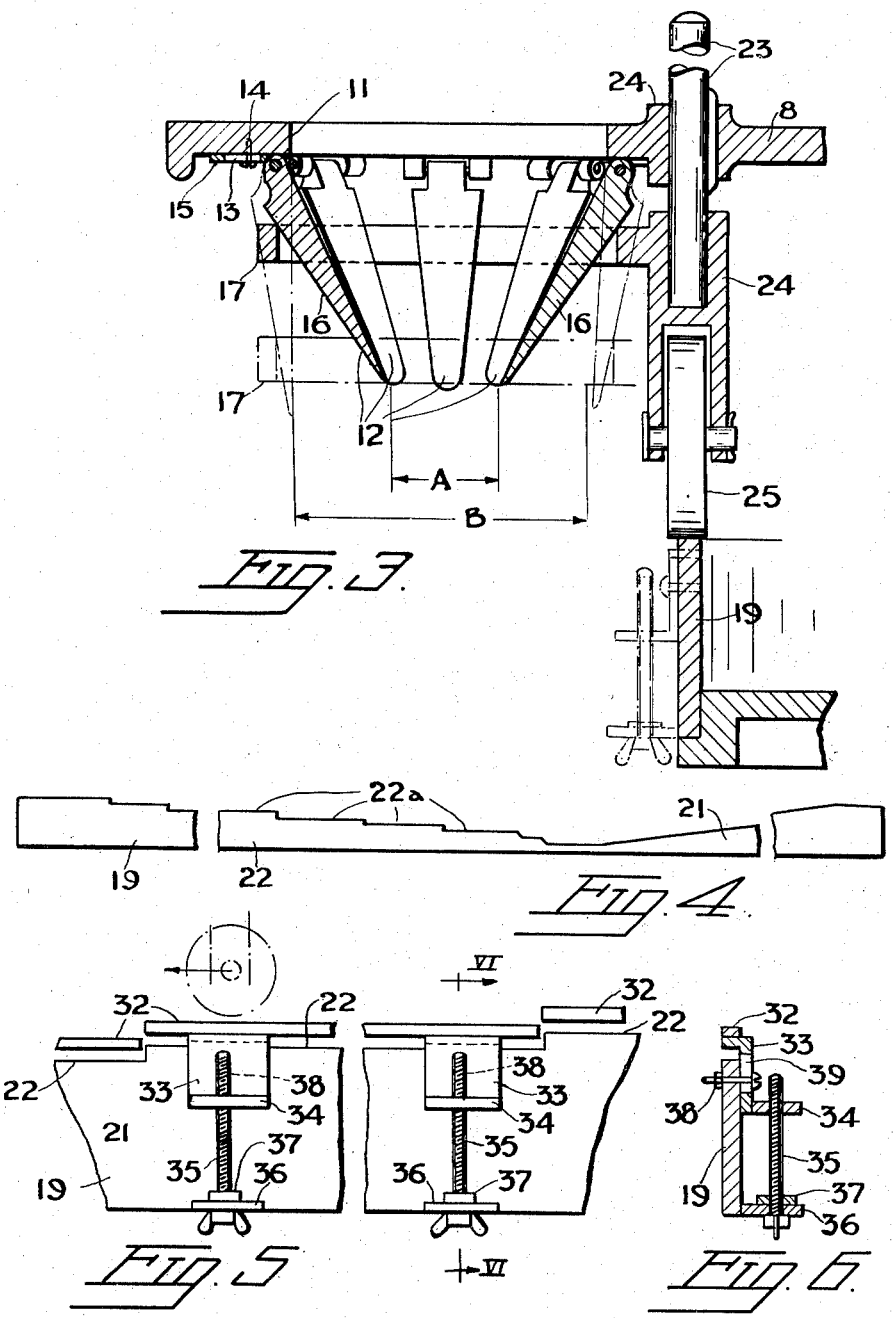

Sept. 19, 1950 J. F. T. ZONDAGH 2,522,917
FRUIT-GRADING APPARATUS
Filed Dec. 2, 1947 3 Sheets-Sheet 3
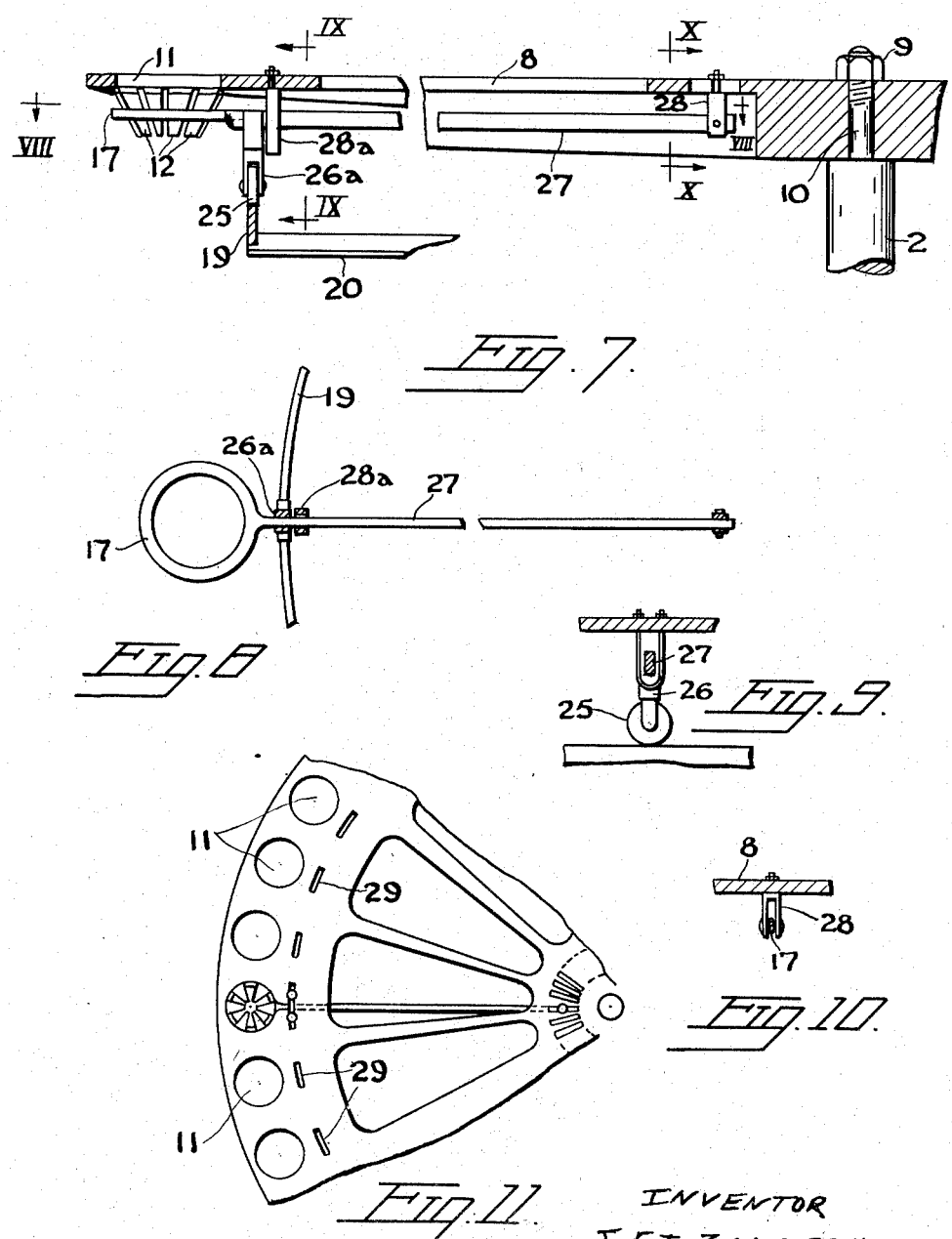
INVENTOR
J. F. T. ZONDAGH
By E. F. Wenderoth
Attorney Patented Sept. 19, 1950

2,522,917

UNITED STATES PATENT OFFICE 2,522,917

FRUIT-GRADING APPARATUS

Johan F. T. Zondagh, Avontuur,
Union of South Africa

Application December 2, 1947, Serial No. 789,190
In the Union of South Africa, December 3, 1946

5 Claims. (Cl. 209—87)

This invention relates to an improved fruit grading apparatus for grading fruit and the like according to size.

An object of the present invention is to provide a fruit grading machine which requires a smaller space in which to operate than the kind commonly in use, and one in which the fruit is subjected to a polishing action during grading.

According to the present invention broadly, the fruit grading apparatus is characterised by, at least one horizontally disposed rotatable disc provided with a plurality of spaced fruit receiving holes, a plurality of co-acting fingers arranged in ring formation in each of said fruit receiving holes by being suspended in pivotal fashion from the underside of said fruit receiving holes to form in each case a substantially funnel-like fruit grading passage, suitable control means co-acting with the free ends of each group of fingers, which means are adapted to be moved independently of each other in vertical directions to control the effective openings of said grading passages for fruit grading purposes, said independent vertical movement of the means being controlled by means of a stationary annular cam having at least one upwardly directed ramp portion and one downwardly directed ramp portion from which said means are controlled by suitable interposed motion transmitting members on rotation of said disc; the arrangement being such that on rotation of the disc or discs each of said control means is forced upwardly when its motion transmitting member engages the upwardly directed ramp portion of the stationary cam so that the free ends of the pivoted fingers move towards each other to restrict the discharge openings of the grading passages to a minimum for purposes of reception of the fruit which is discharged therein for grading purposes, said control means being caused to move successively downwardly when their interposed motion transmitting members engage the downwardly directed ramp portion of the said cam, so that the fruit is permitted to escape through the effective openings of the grading passages when said openings have been expanded by the outward movement of the pivoted fingers, for the selective discharge into one of a plurality of chutes or the like arranged around the machine.

More particularly, in the simplest form of the present invention, a single disc is arranged for rotation on a vertical shaft which is supported in a suitable pedestal. Said disc is provided with a plurality of equal sized holes arranged in spaced relationship adjacent its periphery; each of said holes being provided with a plurality of fingers which are hingedly connected to suitable lugs or brackets which are fixed to the undersides of the disc adjacent to the peripheries of the spaced holes. Said securing lugs are preferably adjustably secured to the disc to permit adjustment in a direction radially to the fruit receiving holes by providing each of said lugs with slots through which the fixing bolts or the like pass. The said fingers normally hang down freely but are capable of being moved inwardly towards each other to form a substantially inverted frustoconically shaped passage having a variable bottom opening.

A plurality of radially disposed arms are hingedly connected to the under surface of the disc adjacent the axis of rotation, and are provided on the movable ends with the ring-like elements disposed co-axially with the holes in the disc with which they co-act. Said rings encircle the fingers of the co-acting holes by having the outside surfaces of said fingers resting against their inner surfaces, so that on upward movement of the free ends of the levers the rings force the fingers towards each other. On downward movement of the said radial arms the fingers open by gravity. Adjacent the rings of each radial lever, a downwardly extending tappet or roller is provided which engages the stationary annular cam.

Each finger is preferably of tapering width and is in addition provided with a tapering projection on its outwardly directed surfaces so that its top end is substantially thicker than its bottom end to facilitate its operational movement when engaged by the ring member.

The direction of rotation of the disc is such that during engagement of the tappets or rollers on the upwardly directed ramp of the stationary annular cam, the radial arms are forced upwardly to bring the fingers together, while during successive engagement of said tappets with the maximum raised portion of the cam, fruit is charged manually or from a synchronised feeding machine one by one into the fruit grading passages formed by the contracted fingers. After reception of a fruit, the opening of the co-acting sets of fingers is effected successively due to the engagement of the radial lever tappets or rollers on the downwardly sloping portion of the stationary annular cam. On opening up of the co-acting fingers to the extent of the size of the fruit carried thereby, said fruit drops out under the action of gravity and is collected in one of a plurality of chutes. Said chutes are preferably arranged to extend radially outwardly for transferring the fruit to that section of the packing department for handling that particular size of fruit graded by the apparatus.

By providing the ramp of the cam for opening of the fingers with a stepped surface, impulses are produced on opening of the fingers whereby the fruits are positively discharged and any retardation of discharge due to friction is largely eliminated. From the aforegoing it will be noted that the fruit is graded from the smaller to the larger sizes during rotation of the discs.

If desired, two or more rotating discs may be arranged, one above the other, which discs will be all of similar construction, so that the rate of grading may be accelerated without increase of floor space. In this construction each disc is provided with a separate chute from the sorting machine or the like.

Should the space in which the apparatus is required to operate be too limited to receive large discs, a plurality of discs may be mounted above each other, so that the limited range of grading provided by the uppermost disc may be continued by the successive disc or discs by arranging the upper disc to discharge ungraded fruit into the fruit-receiving holes of the successive disc.

In an apparatus where more than one disc is utilized, the movable ends of the radial levers located above each other are preferably connected to a common lifting rod to which the tappet or roller is secured to utilise a single stationary annular cam.

The pivotally mounted fingers may be provided with a resilient surface, such as a rubber, felt or like covering, to prevent damage to the outside skin of the fruit during the grading operation.

The said rotating disc or discs may be arranged to be driven by hand- or foot-operated means, but it or they is or are preferably driven by a suitable electric motor, engine or the like.

In a modified form of construction, each ring-like element is mounted in a suitable guide which is fixed to the rotating disc while a downwardly extending tappet or roller provided on each ring-like element engages the aforesaid annular cam.

In order that the present invention may be more clearly understood and carried into practice, reference is now made to the accompanying sheets of drawings, in which like reference numerals refer to like parts throughout the several views.

In the drawings:

Fig. 3 is a detailed view of the portion encircled at III of Fig. 1, drawn to an enlarged scale;

Fig. 4 is a fragmentary developed elevation of the annular cam;

Fig. 5 is a fragmentary elevation of the portion of a modified construction of the annular cam, drawn to an enlarged scale;

Fig. 6 is a cross-section taken on line VI—VI of Fig. 5;

Fig. 7 is a fragmentary vertical cross-section of the preferred form of construction of the grading means of a fruit-grading apparatus constructed according to the present invention;

Fig. 8 is a horizontal cross-section taken on line VIII—VIII of Fig. 6;

Fig. 9 is a vertical cross-section taken on line IX—IX of Fig. 7;

Fig. 10 is a vertical cross-section taken on line X—X of Fig. 7; and

Fig. 11 is a plan of Fig. 6 drawn to a reduced scale.

Figure 1:
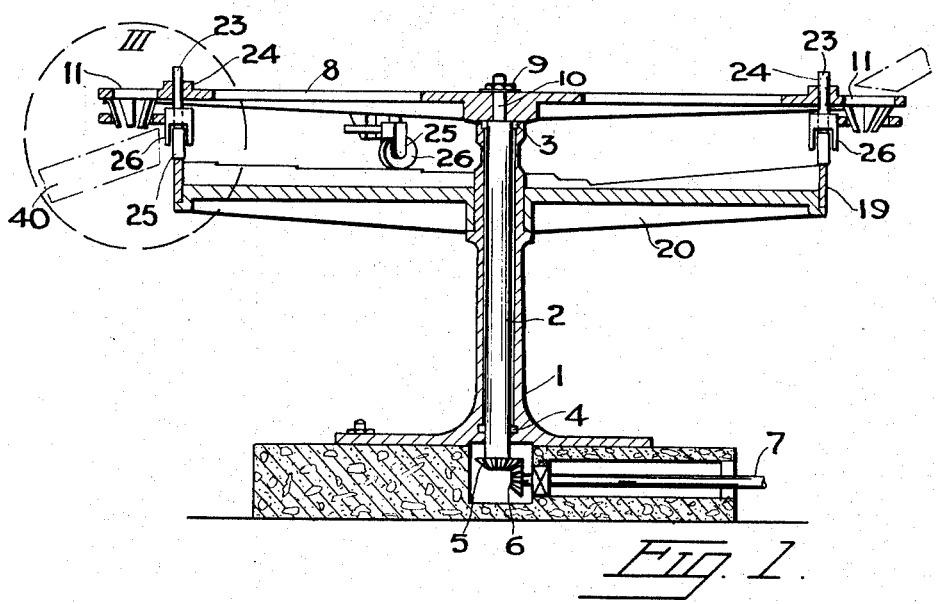
Fig. 1 is a vertical cross-section of a fruit-grading apparatus, constructed according to the present invention, but showing only some of the grading means and associated parts.
Figure 2:
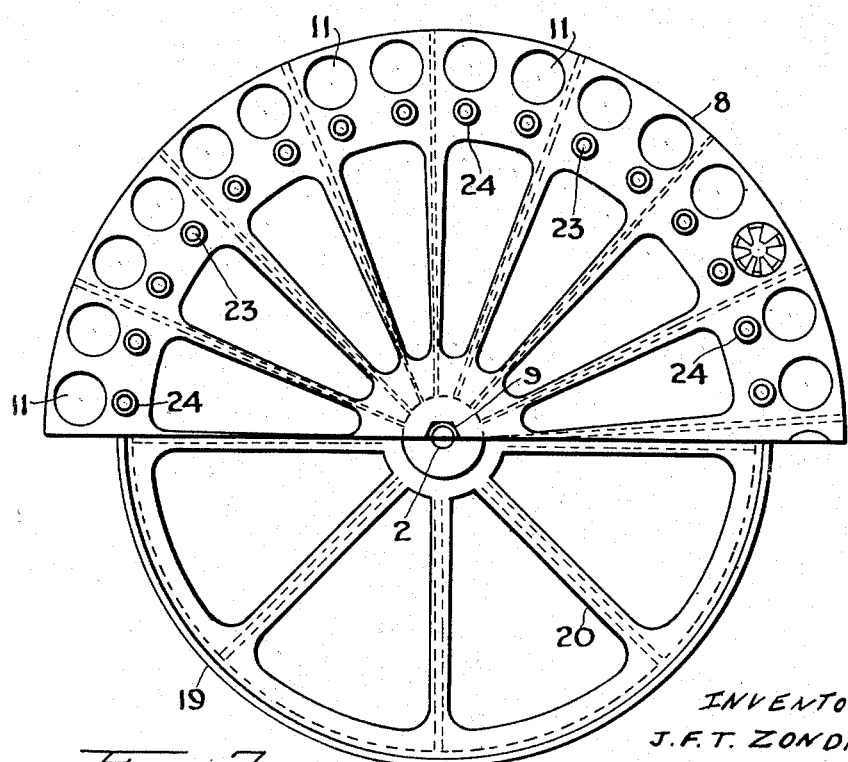
Fig. 2 is a sectional plan of Fig. 1.

Referring to the drawings, reference numeral 1 denotes the apparatus pedestal, in which the vertically disposed shaft 2 is rotatably mounted in roller bearing 3 and 4. The lower end of the shaft 2 carries a bevel gear 5 which is engaged by a bevel pinion 6, mounted on the drive shaft 7. The disc 8 is fixed by means of a nut 9 to a reduced screw-threaded portion 10 on the top end of the shaft 2. The disc 8, which is in the form of a wheel, is provided with a plurality of equally-sized and equally-spaced fruit-receiving holes 11 arranged adjacent the peripheral edge of the said disc 8 along a common pitch circle.

The fingers 12 are hingedly suspended from brackets 13 which are secured to the bottom surface of the disc 8. Each of said brackets 13 is fixed to the disc 8 by means of a screw 14 which passes through a slot 15 provided therein and whereby adjustment of the said brackets and consequently also of the fingers 12 in radial directions is provided.

The fingers 12 are each of substantially tapered shape and are each provided with a slanting surface 16 on the back for engagement by the ring members 17 which causes the closing or the contraction of the grading opening formed by the lower ends 18 of the said fingers 12 when forced upwardly.

Each ring member 17, which encircles the fingers 12, is capable of movement in a vertical direction for changing the position of contact with the fingers 12, said vertical movement is transferred to the said ring member 12 on rotation of the disc 8 from the stationary annular cam 19. The cam 19 is fixed on a stationary wheel-like support 20 co-axially, with the disc 8. The wheel-like support 20 is fixed to the pedestal 1 in a position below the disc 8 and in spaced relationship therewith.

The annular cam 19, which consists of a metal ring, is provided with a smooth upwardly directed ramp 21 extending for approximately ¼ of the circumference, while the downwardly-directed ramp 22 extends for approximately ⅝ of the cam circumference. Said downwardly-directed ramp 22 is of stepped formation, so as to form a plurality of horizontal surfaces 22a arranged successively at different levels.

In one form of construction, the means for imparting the vertical movement to the ring members 17 from the cam 19 on rotation of the disc 8, comprises a vertically-disposed sliding bar 23 for each ring member 17; each of said bars is feather-keyed in a suitable bush 24, provided in the disc 8 adjacent the hole 11; the lower end of each bar 23 is provided with a bracket 26 which locates a roller 25 for rolling engagement with the cam 19, while the ring member 17 is fixed to, or constructed integrally with, the bracket 26.

As the rollers 25 roll along the surface of the cam 19 owing to the rotation of the rotatable disc 8, the bars 23 and brackets 26 move vertically upwardly at a substantially even rate when the rollers engage the upwardly-directed ramp part 21 of the cam 19, but are adapted to move vertically and intermittently downwards with a series of slight impulses when the roller engages the stepped downwardly directed ramp 22. The ring member 17, which performs a similar action causes the free ends 18 of the fingers 12 to converge towards each other when moving upwardly, thus causing the fingers to form a minimum grading opening as shown in full lines in Fig. 3, by the engagement of the thicker upper parts of said fingers 12. When the roller 25 engages the said ramp 22 of the cam 19, the ring member 17 performs an intermittent downwardly directed movement which causes an intermittent increase of the grading opening from the minimum A to the maximum B. The maximum open position of the fingers is shown by chain dotted lines in Fig. 3.

In the preferred construction of the invention, as shown in Figs. 7 to 11, each ring member 17 is fixed to, or constructed integrally with, the end of a substantially horizontally and radially disposed pivoted bar 27. Each bar 27 has its inwardly directed end pivotally supported in a downwardly extending bracket 28 which is fixed to the disc 8 adjacent the axis thereof. Each bracket 28 is fixed in an adjustable fashion in a radial slot 29 provided in the disc 8, in order to permit adjustment of location of the ring member 17, in a radial direction. The outer end of each bar 27, adjacent its ring 17, is fixed to the roller supporting bracket 26a and is also located in a guide 28a comprising a substantially U-shaped strap provided with a pair of upwardly extending screw-threaded elements which extend through arcuate slots 29, provided in the disc 8, for fixing by means of co-acting nuts. The said slots 29 permit adjustment of the ring member 17 and bar 27 in arcuate directions. In operation the roller 25 of brackets 26a, by engaging the cam 19 and on rotation of the disc 8, causes the upward and downward movement of the ring-like member along a substantially vertical arcuate path.

A modified form of construction of the annular cam 19 is shown in Figs. 4 and 5 (also by broken lines in Fig. 3) whereby adjustment of each stepped horizontal part 22a of the downwardly directed ramp 22 may be separately effected.

An adjustable strip or bar 32 is provided on each horizontal part 22a; each strip or bar having two downwardly directed slotted supports 33 which in turn have horizontal ends 34 provided with screw-threaded holes. The said screw-threaded holes of the horizontal end parts 34 are engaged by co-acting upwardly extending adjusting thumb-screws 35, which are rotatably located in horizontal lugs 36 fixed to the cam 19 (or to cam support 30) and which are adapted to be locked by a lock-nut 37. On loosening the lock-nut 37 the bar 32 may be readily adjusted by an upward or downward movement on rotating the thumb-screws 35, while the final setting of the bar 32 is locked by locking bolts 38 engaging the slots 39 of the bar supports 33.

A plurality of chutes 40 or the like, extending radially outwardly of the apparatus are provided for transferring the graded fruit to suitable collecting means which preferably consist of cylindrical drums mounted for rotation about vertical axes. The receiving ends of the chutes 40 or the like are placed in such positions as to receive the fruit as it escapes through the grading openings formed by the fingers 12. The opening or separation of the fingers 12 is caused by their own weights as well as the weight of the fruit carried in the substantially inverted frusto-conically shaped pockets or baskets formed by co-acting series of fingers.

If desired a short rigid bar may be fixed to and in spaced relationship with the back surface of each finger, for embracing the ring 17, whereby a forced opening of such fingers by the ring member 17 will result, should the pivoting action of a finger be resisted.

The fruit may be charged in the fruit receiving holes 11 manually by operators placed adjacent the disc 8 and on both sides of one or more tables on which sorting is done. However, after the sorting the fruit may be fed into the fruit receiving holes by a suitable synchronised mechanical means.

The chutes 40 are preferably of such length that sufficient space is left around the bins or containers into which the graded fruit is discharged, in order to allow sufficient space for the workers for wrapping and packing operations.

In operation the machine is preferably mounted on a raised platform, so that the graded fruit will gravitate to the various sections of the packing department.

The graded fruit is preferably discharged into a suitable chute manufactured from canvas and lined with a soft material, so that a polishing action takes place during the passage to the packing department. Such canvas chutes (or funnels) are preferably of such construction that they may be readily laced together for operation and unlaced for cleaning by a shaking action, or by means of a vacuum cleaner or the like.

The fruit is preferably directed from the sorting machine on to the grading machine by means of a canvas chute which is provided with a suitable spiral passage such as a helical spring or the like to retard the speed of the fruit grading passages of a rotating disc.

I claim:

1. A fruit grading apparatus comprising a vertical rotatable shaft, a circular disc secured to the upper end of said shaft, said disc having a plurality of spaced fruit receiving openings therein in proximity to the periphery of said disc, a plurality of finger members having inclined rear faces thereon pivotally suspended in a circle from said disc below each said opening and forming fruit grading passages, a plurality of radially extending bars pivotally attached below said disc, a ring member surrounding each group of said fingers secured to the outer end of said radial bars and in contact with said inclined faces, an annular cam positioned below said disc, means connected to said bars adjacent said rings and coacting with said cam to raise and lower said rings to enlarge and restrict said grading passages, each said radial bar being separately operable by said cam, said disc having a plurality of radially extending slots therein surrounding each said opening, bracket members secured to said disc in said slots, said fingers being pivotally connected to said brackets, said brackets being radially adjustable in said slots and comprising means for radially adjusting each said finger with respect to the opening below which suspended.

2. A fruit grading apparatus comprising a vertical rotatable shaft, a circular disc secured to the upper end of said shaft, said disc having a plurality of spaced fruit receiving openings therein in proximity to the periphery of said disc, a plurality of finger members having inclined rear faces thereon pivotally suspended in a circle from said disc below each said opening and forming fruit grading passages, a plurality of radially extending bars pivotally attached below said disc, a ring member surrounding each group of said fingers secured to the outer end of said radial bars and in contact with said inclined faces, an annular cam positioned below said disc, means connected to said bars adjacent said rings and coacting with said cam to raise and lower said rings to enlarge and restrict said grading passages, each said radial bar being separately operable by said cam, said disc having a plurality of radially extending slots therein in close proximity to the said rotatable shaft, a downwardly extending bracket slidably secured in each said radial slot, said bracket pivotally supporting the inner ends of said radially extending bars, said disc having a plurality of arcuate slots therein corresponding in number to said fruit receiving openings and in close proximity therewith, guide members slidably secured in said arcuate slots, said radial bars being supported in said guide members inwardly from said raising and lowering means for said rings, each said radial arm being adjustable radially and arcuately by means of said radial and arcuate slots whereby each said ring may be adjusted with respect to the said openings and to the said fingers suspended therebelow.

3. In a fruit grading apparatus as claimed in claim 2, said annular cam having a substantially smooth gradually upwardly sloping ramp on a portion thereof and a downwardly sloping ramp having a plurality of steps therein on the other portion thereof, said stepped portion of said cam imparting a plurality of impulses to said raising and lowering means for said rings connected to said bars for enlarging and restricting said grading passages by opening and closing said fingers.

4. In a fruit grading apparatus as claimed in claim 3, said annular cam being rotatably mounted whereby the discharge point through the said fruit grading passages may be adjusted and varied.

5. In a fruit grading apparatus as claimed in claim 4, flat bar members on each said stepped portion of said cam, adjusting means for raising and lowering each said flat bar, a locking bolt for each said flat bar, said flat bars being vertically adjustable for altering the effective level thereof whereby the said rings may be arranged to enlarge or restrict said passages in a variable manner.

JOHAN FREDERICK TAUTE ZONDAGH.

REFERENCES CITED

The following references are of record in the file of this patent:

UNITED STATES PATENTS

| Number | Name | Date |
|---|---|---|
| 1,157,279 | Young | Oct. 19, 1915 |
| 1,182,505 | Porter | May 9, 1916 |
| 1,184,209 | Porter | May 23, 1916 |
| 1,269,010 | Shaw | June 11, 1918 |
| 1,337,257 | O'Quinn | Apr. 20, 1920 |
| 1,680,880 | Hartraupf et al. | Aug. 14, 1928 |

FOREIGN PATENTS

| Number | Country | Date |
|---|---|---|
| 800,616 | France | May 4, 1938 |